United States Patent Office 3,833,598
Patented Sept. 3, 1974

3,833,598
AMINO DERIVATIVES OF PYRAZOLOPYRIDINE-6-CARBOXYLIC ACIDS AND ESTERS
Theodor Denzel, Nuremberg, and Hans Hoehn, Tegernheim, Germany, assignors to E. R. Squibb & Sons, Inc., Princeton, N.J.
No Drawing. Filed Dec. 29, 1972, Ser. No. 319,949
The portion of the term of the patent subsequent to Aug. 28, 1990, has been disclaimed
Int. Cl. C07d 31/36
U.S. Cl. 260—295 F       10 Claims

ABSTRACT OF THE DISCLOSURE

New amino derivatives of pyrazolo[3,4-b]pyridine-6-carboxylic acids and esters have the general formula

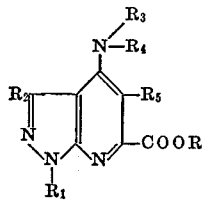

They are useful as central nervous system depressants and anti-inflammatory agents. In addition, the new compounds increase the intracellular concentration of adenosine-3',5'-cyclic monophosphate.

SUMMARY OF THE INVENTION

This invention relates to new amino derivatives of pyrazolo[3,4 - b]pyridine-6-carboxylic acids, their esters and salts of these compounds as well as processes for producing them. These new compounds have the formula (I)

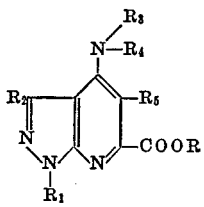

The symbols have the following meanings in formula I and throughout this specification. R is hydrogen or lower alkyl, $R_1$ is hydrogen, lower alkyl, phenyl or phenyl-lower alkyl, $R_2$ is hydrogen or lower alkyl. The basic nitrogen group

is an acyclic amino group wherein $R_3$ and $R_4$ each is hydrogen, lower alkyl, phenyl, substituted phenyl (i.e., the phenyl ring contains one or two simple substituents including lower alkyl, trifluoromethyl or carboxy, preferably only one of the latter two substituents), phenyl-lower alkyl or di-lower alkylamino-lower alky (preferably only one of the last named group). This basic group may also form a heterocyclic of 5- or 6-members in which an additional nitrogen is present, i.e., the pyrrolidino, piperidino, pyrazolyl, dihydropyridazinyl or piperazinyl radicals, each of which may also bear as a substituent a hydroxy-lower alkyl group or one or two lower alkyl groups. That is to say, $R_3$ and $R_4$ each is hydrogen, lower alkyl, $R_6,R_7$-phenyl (wherein $R_6$ and $R_7$ each is hydrogen, lower alkyl, trifluoromethyl or carboxy, preferably only one of the latter two groups), phenyl-lower alkyl or di-lower alkylamino-lower alkyl, or $R_3$ and $R_4$ together with the nitrogen to which they are attached form one of the heterocyclics mentioned above or the $R_8$-monosubstituted or $R_8,R_9$-disubstituted derivative (wherein $R_8$ and $R_9$ are hydrogen, lower alkyl or hydroxy-lower alkyl). $R_5$ is hydrogen, lower alkyl, phenyl, phenyl-lower alkyl or halogen.

The lower alkyl groups in any of the foregoing radicals are straight or branched chain hydrocarbon groups of up to seven carbon atoms like methyl, ethyl, propyl, isopropyl, butyl, t-butyl and the like. The one to four carbon members are preferred.

All four halogens are contemplated but chlorine and bromine are preferred.

The products of the examples, which are representative of the various compounds of this invention, constitute preferred embodiments. Preferably $R_3$ is hydrogen, particularly when $R_4$ includes a cyclic substituent. Preferred heterocyclic radicals are those shown in the example, especially piperidino and piperazino and their methyl and hydroxyethyl derivatives. Especially preferred compounds of formula I are those wherein R is hydrogen or lower alkyl, especially ethyl, $R_1$ is hydrogen ethyl or butyl, $R_2$ is hydrogen or methyl, $R_3$ is ethyl, propyl or butyl, $R_4$ is hydrogen or ethyl and $R_5$ is hydrogen, methyl or chlorine.

DETAILED DESCRIPTION OF THE INVENTION

The new compounds of formula I are produced by the following series of reactions. The symbols in the formulas have the same meaning previously described.

(II)

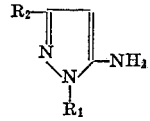

[produced analogous to the procedure described in Z.f. Chemie 10, 386 (1970)], is made to react with an oxalacetic acid ester of the formula (III)

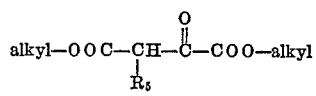

by heating at a temperature of about 110–120° C. in an acidic solvent like acetic acid analogous to the procedure in Pharmazie, 26, 732 (1971). The resulting compound of the formula (IV)

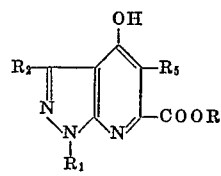

with the hydroxy group in the 4-position is refluxed for several hours with a phosphorus halide like phosphorus oxychloride to obtain the intermediate of the formula (V)

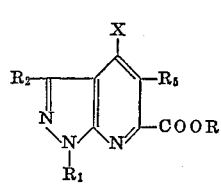

wherein X is halogen, preferably chlorine or bromine. Instead of halogenating, reaction of the compounds of formula IV with an alkyl halide in the presence of an inorganic base, like potassium carbonate, produces a compound of the formula (VI)

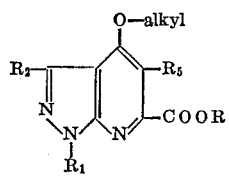

The products of formula I are then prepared from compounds of formula V or VI by reaction with the appropriate primary or secondary amine of the formula (VII)

This reaction is effected by treating the reactants either at room or elevated temperatures. In some cases it may be advantageous to make use of an autoclave.

A product of formula I wherein $R_1$ is hydrogen is produced by a modification of the foregoing procedure. According to this modification, a 5-aminopyrazole of formula II, wherein $R_1$ is an arylmethyl group, or a heteromethyl group is used. This starting material has the formula (IIa)

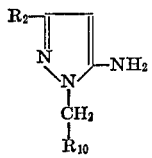

wherein $R_{10}$ is an aromatic or heterocyclic nucleus like phenyl, furyl, pyridyl, pyrimidyl or the like.

This material is processed as described above through the reaction with the oxalacetic acid ester of formula III to obtain a compound of formula IV with a hydroxy group in the 4-position. Then alkylating leads to a compound of the formula (Va)

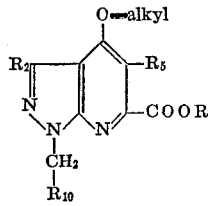

At this point, the compound of formula Va is oxidized with an oxidizing agent like selenium dioxide in a high boiling solvent like diethyleneglycol dimethylether at about 160°. This yields a compound of formula VI wherein $R_1$ is hydrogen. This product may be treated with a primary or secondary amine as described above.

The compounds of formula I form salts which are also part of this invention. The salts include acid-addition salts, particularly the non-toxic, physiologically acceptable members. The bases of formula I form salts by reaction with a variety of inorganic and organic acids providing acid addition salts including, for example, hydrohalides (especially the hydrochloride), sulfate, nitrate, phosphate, oxalate, tartrate, malate, citrate, acetate, ascorbate, succinate, benzenesulfonate, cyclohexanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I, or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg./kg./day, preferably about 10 to 50 mg./kg., in single or two to four divided doses in conventional oral or parenteral dosage forms such as those described above may be used to alleviate the symptoms of asthma.

The new compounds of this invention, in addition, have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance may be utilized in compositions such as tablets, capsules, solutions or suspensions containing up to about 300 mg. per unit of dosage of a compound or mixture of compounds of formula I or physiologically acceptable acid addition salt thereof. They may be compounded in conventional manner with a physiologically acceptable vehicle or carrier, excipient, binder, preservative, stabilizer, flavor, etc., as called for by accepted pharmaceutical practice. Topical preparations containing about 0.01 to 3 percent by weight of active substance in a lotion, salve or cream may also be used.

The following examples are illustrative of the invention. All temperatures are on the centigrade scale.

EXAMPLE 1

4-Butylamino-1-ethyl-1H-pyrazolo[3,4-b]pyridine-6-carboxylic acid (a) 1-ethyl - 4 - hydroxy-1H-pyrazolo[3,4-b]pyridine-6-carboxylic acid ethyl ester.—111 g. of 5-amino-1-ethylpyrazole (1 mol.) and 210 g. of sodium oxalacetic acid ethyl ester (1 mol.) are refluxed in 1 liter of acetic acid for 5 hours. After this period the acetic acid is removed in vacuo and the residue is treated with water. 1-ethyl-4-hydroxy-1H-pyrazolo[3,4-b]pyridine - 6 - carboxylic acid ethyl ester solidifies, is filtered off and recrystallized from methanol, m.p. 178–180°, yield 198 g. (84%).

(b) 4-ethoxy - 1 - ethyl-1H-pyrazolo[3,4-b]pyridine-6-carboxylic acid ethyl ester.—23.5 g. of 1-ethyl-4-hydroxy-1H-pyrazolo[3,4-b]pyridine-6-carboxylic acid ethyl ester (0.1 mol.) are dissolved in 100 ml. of anhydrous dimethylformamide. 22 g. of potassium carbonate (0.15 mol.) and 19 g. of ethyl iodide (0.12 mol.) are added and the mixture is heated with stirring for 10 hours at 50°. The precipitate is filtered off and the filtrate is treated with water. 4-ethoxy - 1 - ethyl-1H-pyrazolo[3,4-b]pyridine-6-carboxylic acid ethyl ester solidifies on cooling and is recrystallized from ligroin, m.p. 36–38°, yield 19.5 g. (74%).

(c) 4 - butylamino - 1 - ethyl-1H-pyrazolo[3,4-b]pyridine-6-carboxylic acid ethyl ester.—26.3 g. of 4-ethoxy-1-ethyl-pyrazolo[3,4-b]pyridine - 6 - carboxylic acid ethyl ester (0.1 mol.) are refluxed for 10 hours in 50 ml. of n-butylamine. After evaporation of the excess butylamine in vacuo, the residual crystalline 4-butylamino-1-ethyl-pyrazolo[3,4-b]pyridine-6-carboxylic acid ethyl ester is recrystallized from ligroin, m.p. 69–70°, yield 21 g. (72%).

(d) 4 - butylamino - 1 - ethyl-1H-pyrazolo[3,4-b]pyridine-6-carboxylic acid.—14.5 g. of 4-butylamino-1-ethyl-pyrazolo[3,4-b]pyridine - 6 - carboxylic acid ethyl ester (0.05 mol.) are heated for 10 hours at 80° in an ethanolic solution of 4.2 g. of potassium hydroxide (0.075 mol.). After this period, the mixture is evaporated to dryness, the residue is dissolved in 50 ml. of water and acidified with acetic acid. 4-butylamino-1-ethyl-1H-pyrazolo[3,4-b]pyridine-5-carboxylic acid solidifies, is filtered off and recrystallized from acetic acid, m.p. 195–197°, yield 10.5 g. (80%).

According to the foregoing procedure, the following compounds are prepared:

filtrate is cooled in an ice bath. 4-ethoxy-1H-pyrazolo[3,4-b]pyridine-6-carboxylic acid ethyl ester crystallizes and is recrystallized from butyl alcohol, yield 1.5 g. (64%).

(d) 4 - sec.butylamino - 1H-pyrazolo[3,4-b]pyridine-6-carboxylic acid ethyl ester.—2.5 g. of 4-ethoxy-1H-pyrazolo[3,4-b]pyridine-6-carboxylic acid ethyl ester (0.01 mol.) are refluxed for 24 hours with 10 ml. of sec. butylamine. After this time, water is added and the crystalline 4-sec. butylamino - 1H - pyrazolo[3,4 - b[pyridine-6-carboxylic acid ethyl ester is filtered off then recrystallized from butanol, m.p. 158–160°, yield 2.2 g. (83%).

EXAMPLE 10

4-Butylamino-1-ethyl-5-methylpyrazolo[3,4-b]pyridine-6-carboxylic acid ethyl ester (a) 1 - ethyl - 4-hydroxy-5-methylpyrazolo[3,4-b]pyridine-6-carboxylic acid ethyl ester.—111 g. 5-amino-ethyl-pyrazole (1 mol.) and 202 g. of oxalopropionic acid ethyl

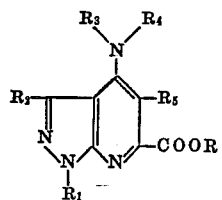

| Example: | $R_1$ | $R_2$ | $R_3$ | $R_4$ | $R_5$ | R |
|---|---|---|---|---|---|---|
| 2 | —$C_2H_5$ | $CH_3$ | H | $C_4H_9$ | H | $C_2H_5$ |
| 3 | —$C_2H_5$ | H | $CH_3$ | $CH_3$ | H | $C_2H_5$ |
| 4 | —$C_2H_5$ | H | H | —⟨O⟩ | H | $C_2H_5$ |
| 5 | —$C_2H_5$ | H | H | Same as above | H | H |
| 6 | —$CH_2$—⟨O⟩ | $CH_3$ | —$CH_2$—$CH_2$—$CH_2$—$CH_2$—$CH_2$— | | H | $C_2H_5$ |
| 7 | —$C_2H_5$ | H | H | Sec. $C_4H_9$ | $CH_3$ | $C_2H_5$ |
| 8 | —$C_2H_5$ | H | H | Sec. $C_4H_9$ | $CH_3$ | H |

EXAMPLE 9

4-sec.Butylamino-1H-pyrazolo[3,4-b]pyridine-6-carboxylic acid ethyl ester (a) 1 - furfuryl-4-hydroxy-1H-pyrazolo[3,4-b]pyridine-6-carboxylic acid ethyl ester.—163 g. of 5-amino-1-furfurylpyrazole (1 mol.) and 210 g. of sodium oxalacetic acid ethyl ester (1 mol.) are refluxed in 1 liter of acetic acid for 3 hours. The solvent is distilled off and the residue is treated with water. 1-furfuryl-4-hydroxy-1H-pyrazolo[3,4 - b]pyridine - 6 - carboxylic acid ethyl ester crystallizes and is filtered off then recrystallized from methanol, m.p. 220–221°, yield 190 g. (73%).

(b) 4-ethoxy - 1 - furfuryl-1H-pyrazolo[3,4-b]pyridine-6-carboxylic acid ethyl ester.—28.7 g. of 1-furfuryl-4-hydroxy-1H-pyrazolo[3,4-b]pyridine ethyl ester (0.1 mol.) are dissolved in 100 ml. of dimethylformamide. 22 g. of potassium carbonate (0.15 mol.) and 19 g. of ethyl iodide (0.12 mol.) are added and the mixture is heated with stirring for 10 hours at 60°. The precipitate is filtered off, the filtrate is treated with water. 4-ethoxy-1-furfuryl-1H-pyrazolo[3,4 - b]pyridine - 6 - carboxylic acid ethyl ester solidifies on cooling and is recrystallized from methanol, m.p. 45–47°, yield 21.5 g. (68%).

(c) 4-ethoxy-1H-pyrazolo[3,4-b]pyridine-6-carboxylic acid ethyl ester.—3.2 g. of 4 - ethoxy - 1 - furfuryl-1H-pyrazolo[3,4-b]pyridine-6-carboxylic acid ethyl ester (0.01 mol.) and 1.5 g. of selenium dioxide (0.013 mol.) are heated to 10 ml. of diethyleneglycol dimethylether for 1.5 hours at 160°. The solution is filtered hot and the ester (1 mol.) are heated in 1 liter of acetic acid for 3 hours under reflux. The solvent is distilled off and the residue is recrystallized from ethanol, yield 185 g. of 1-ethyl - 4 - hydroxy - 5-methylpyrazolo[3,4-b]pyridine-6-carboxylic acid ethyl ester (68%), m.p. 201–203°.

(b) 4 - ethoxy - 1-ethyl-5-methylpyrazolo[3,4-b]pyridine-6-carboxylic acid ethyl ester.—24.9 g. of 1-ethyl-4-hydroxy - 5 - methylpyrazolo[3,4-b]pyridine-6-carboxylic acid ethyl ester (0.1 mol.), 22 g. of potassium carbonate (0.15 mol.) and 23 g. of ethyl iodide are heated in 150 ml. of dimethylformamide for 10 hours at 60° with continuous stirring. The excess potassium carbonate and potassium iodide are filtered off and water is added to the filtrate. 4 - ethoxy - 1-ethyl-5-methylpyrazolo[3,4-b]pyridine-6-carboxylic acid ethyl ester solidifies and is recrystalized from methanol, yield 21.5 g. (78%), m.p. 54–56°.

(c) 4 - butylamino - 1-ethyl-5-methylpyrazolo[3,4-b] pyridine-6-carboxylic acid ethyl ester.—2.8 g. of 4-ethoxy-1 - ethyl - 5-methylpyrazolo[3,4-b]pyridine-6-carboxylic acid ethyl ester (0.01 mol.) and 10 ml. of n-butylamine are heated in an autoclave at 160° for 8 hours. After this time, the excess butylamine is evaporated and the residue is recrystallized from methanol, yield 2,2 g. (72%), m.p. 78–80°. The hydrochloride salt is formed by adding to a solution containing 1 g. of this product in 10 ml. of ether, with cooling, 1 ml. of an alcoholic solution of hydrochloric acid.

The following additional products are made by the procedure of Example 1, 9 or 10:

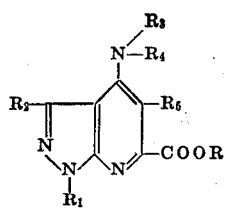

| Ex. | R₁ | R₂ | R₃ | R₄ | R₅ | R |
|---|---|---|---|---|---|---|
| 11 | CH₃—CH₂— | CH₃— | CH₃—CH₂— | CH₃—CH₂— | C₂H₅ | C₂H₅— |
| 12 | CH₃—CH₂— | H | —CH₂—CH₂—N(CH₃)—CH₂—CH₂— | | H | C₂H₅ |
| 13 | CH₃—CH₂— | H | —(CH₂)₃N(C₂H₅)₂ | H | CH₃ | C₂H₅ |
| 14 | CH₃—CH₂— | H | —CH₂—CH₂—CH₂—CH₂—CH₂— | | H | C₂H₅ |
| 15 | CH₃—CH₂— | C₂H₅ | CH₃—CH₂— | CH₃—CH₂— | —C₆H₅ | C₂H₅ |
| 16 | CH₃—CH₂— | H | —(CH₂)₂N(C₂H₅)₂ | H | H | C₂H₅ |
| 17 | CH₃—CH₂— | CH₃ | H | H | —(CH₂)₂—C₆H₅ | C₂H₅ |
| 18 | CH₃—CH₂— | H | —C(CH₃)=CH—C(CH₃)=N—CH₂—CH₂— | | C₂H₅ | C₂H₅ |
| 19 | CH₃—CH₂— | CH₃ | —CH₂—CH₂—N—CH₂—CH₂— | | H | C₂H₅ |
| 20 | CH₃—CH₂— | H | —CH₂—CH₂—N(CH₂—CH₂—OH)—CH₂—CH₂— | | H | C₂H₅ |
| 21 | CH₃—CH₂— | H | H | H | —C₆H₅ | H |
| 22 | CH₃ | H | —(CH₂)₃CH₃ | H | H | C₂H₅ |
| 23 | CH₃ | H | —(CH₂)₃CH₃ | H | CH₃ | H |
| 24 | CH₃—CH₂— | H | —CH=C(CH₃)—C(CH₃)=NH— | | H | C₂H₅ |
| 25 | C₆H₅—CH₂—CH₂— | H | —(CH₂)₃CH₃ | H | H | C₂H₅ |
| 26 | CH₃—CH₂— | H | —C₆H₄—CF₃ | H | H | C₂H₅ |
| 27 | CH₃—CH₂— | H | —C₆H₃(CF₃)₂ | H | CH₃ | H |
| 28 | CH₃—CH₂— | H | —CH(CH₃)(CH₂CH₃) | H | —CH₂—C₆H₅ | C₂H₅ |
| 29 | CH₃—CH₂— | H | —CH₂—C₆H₅ | H | CH₃ | C₂H₅— |
| 30 | CH₃—CH₂— | H | —CH₂—CH₂—C₆H₅ | H | H | C₂H₅— |
| 31 | CH₃— | H | —CH(CH₃)₂ | H | H | C₂H₅— |
| 32 | CH₃—CH₂— | H | —(CH₂)₅CH₃ | H | H | C₂H₅— |
| 33 | C₆H₅— | CH₃— | —(CH₂)₃CH₃ | H | H | C₃H₇— |
| 34 | CH₃—(CH₂)₃— | H | —C₆H₅ | H | H | C₂H₅ |
| 35 | CH₃—CH₂— | H | —C₆H₃(CH₃)₂ | H | CH₃ | C₂H₅ |
| 36 | CH₃—CH₂— | H | —C₆H₃(CH₃)₂ | H | H | H |
| 37 | CH₃—CH₂— | H | —C₆H₄—COOH | H | H | C₂H₅ |
| 38 | CH₃(CH₂)₃— | CH₃— | —(CH₂)₃CH₃ | H | CH₃ | C₂H₅ |
| 39 | C₆H₅— | H | —(CH₂)₃CH₃ | H | CH₃ | C₂H₅ |

EXAMPLE 40

4-Butylamino-5-chloro-1-ethyl-1H-pyrazolo[3,4-b]pyridine-5-carboxylic acid ethyl ester

(1) 5-chloro - 1 - ethyl - 1H - pyrazolo[3,4-b]pyridine-6-carboxylic acid ethyl ester.—111 g. of 5 - amino-1-ethyl-pyrazole (1 mol.) and 222 g. of chloro-oxalo acetic acid, ethyl ester are refluxed in 1 ltr. of acetic acid for 4 hours. The acetic acid is removed in vacuo, and the solid residue is recrystallized from methanol. Yield 211 g. (78%), m.p. 183–194°.

(2) 5-chloro - 4 - ethoxy - 1 - ethyl - 1H - pyrazolo-[3,4-b]pyridine - 6 - carboxylic acid, ethyl ester.—26.9 g. of 5-chloro - 1 - ethyl - 4 - hydroxy-1H-pyrazolo[3,4-b]pyridine - 6 - carboxylic acid, ethyl ester (0.1 mol.) are dissolved in 100 ml. of DMF. 21 g. of potassium carbonate (0.15 mol.) and 18.6 g. of ethyl iodide (0.12 mol.) are added and the mixture is kept at 60° with stirring for 10 hours. The undissolved material is filtered off and water is added. The 5-chloro - 4 - ethoxy - 1 - ethyl-1H-pyrazolo-[3,4-b]pyridine - 6 - carboxylic acid ethyl ester solidifies and is recrystallized from petrol ether. Yield 20.5 g. (69%), m.p. 36–37°.

(3) 4-butylamino - 5 - chloro - 1 - ethyl-1H-pyrazolo-[3,4-b]pyridine - 6 - carboxylic acid ethyl ester.—2.9 g. of 5-chloro - 4 - ethoxy - 1 - ethyl - 1H - pyrazolo[3,4-b]pyridine - 6 - carboxylic acid, ethyl ester (0.01 mol.) are refluxed in 100 ml. of n-butylamine for 48 hours. The excess amine is distilled off and the residue is recrystalized from petrol ether. Yield 2.5 g. (78%), m.p. 71–73°.

According to the foregoing procedure the following compounds are prepared.

wherein
R is hydrogen or lower alkyl; $R_1$ is hydrogen, methyl, ethyl, phenyl benzyl or phenethyl; $R_2$ is hydrogen, methyl or ethyl; $R_3$ and $R_4$ each is hydrogen, lower alkyl, phenyl, $R_6,R_7$-phenyl, $R_6,R_7$-phenyl-lower alkyl or di-lower alkylamino-lower alkyl; $R_5$ is hydrogen, methyl, ethyl, phenyl, benzyl, phenethyl or halogen; $R_6$ and $R_7$ each is hydrogen, lower alkyl, trifluoromethyl or carboxyl,
and physiologically acceptable acid addition salts thereof.

2. A compound as in Claim 1 wherein R is hydrogen or lower alkyl, $R_1$ is hydrogen, ethyl, $R_2$ is hydrogen or methyl, $R_3$ is ethyl, propyl or butyl, $R_4$ is hydrogen or methyl and $R_5$ is hydrogen or methyl.

3. A compound as in Claim 1 wherein R, and $R_3$ each is lower alkyl, and $R_2$, $R_4$ and $R_5$ each is hydrogen.

4. A compound as in Claim 3 wherein R and $R_1$ each is ethyl and $R_3$ is butyl.

5. A compound as in Claim 1 wherein $R_3$ is lower alkyl and R, $R_2$, $R_4$ and $R_5$ each is hydrogen.

6. A compound as in Claim 5 wherein $R_1$ is ethyl and $R_3$ is butyl.

7. A compound as in Claim 1 wherein R and $R_3$ each is lower alkyl and $R_1$, $R_2$, $R_4$ and $R_5$ each is hydrogen.

8. A compound as in Claim 7 wherein R is ethyl and $R_3$ is butyl.

9. A compound as in Claim 1 wherein R and $R_3$ each is lower alkyl and $R_2$ and $R_4$ each is hydrogen.

10. A compound as in Claim 9 wherein R and $R_1$ each is ethyl, $R_3$ is butyl and $R_5$ is methyl.

| | $R_1$ | $R_2$ | $R_3$ | $R_4$ | $R_5$ | R |
|---|---|---|---|---|---|---|
| 41 | $C_2H_5$ | H | H | H | Cl | $C_2H_5$ |
| 42 | $C_2H_5$ | $CH_3$ | $C_4H_9$ | H | Cl | $C_2H_5$ |
| 43 | —CH(CH$_3$)$_2$ | H | $C_3H_7$ | H | Br | $C_2H_5$ |
| 44 | $C_2H_5$ | H | phenyl | H | Cl | $C_2H_5$ |
| 45 | $C_2H_5$ | H | —CH$_2$—CH$_2$—CH$_2$—CH$_2$—CH$_2$—(CF$_3$-phenyl) | H | Cl | $C_2H_5$ |
| 46 | $C_2H_5$ | $CH_3$ | (same) | H | Br | $C_2H_5$ |
| 47 | $C_2H_5$ | H | $C_2H_5$ | $C_2H_5$ | Cl | $C_2H_5$ |

What is claimed is:

1. A compound of the formula

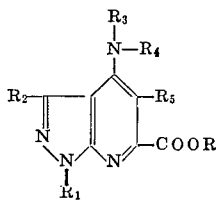

References Cited

UNITED STATES PATENTS 3,755,340  8/1973  Hoehn et al.  260—295.5 B
3,736,326  5/1973  Denzel et al.  260—295.5 B ALAN L. ROTMAN, *Primary Examiner*

U.S. Cl. X.R.

260—250 A, 268 BC, 294.8 R, 293.6; 424—250, 266, 267

UNITED STATES PATENT AND TRADEMARK OFFICE
CERTIFICATE OF CORRECTION

PATENT NO. : 3,833,598
DATED : September 3, 1974
INVENTOR(S) : Theodor Denzel, Hans Hoehn It is certified that error appears in the above-identified patent and that said Letters Patent are hereby corrected as shown below:

Column 2, line 18, -- example -- should be "examples".
Column 2, line 30, "A 5-aminopyrazole of the formula" has been omitted. Column 6, line 69, --2,2 g.-- should be "2.2 g.".
Column 9, line 10, -- 194° -- should be "184°".
line 27, -- 100 ml. -- should be "10 ml.".

$\mathfrak{Signed}$ and $\mathfrak{Sealed}$ this

Thirty-first $\mathfrak{Day}$ $\mathfrak{of}$ August 1976

[SEAL]

Attest:

RUTH C. MASON
*Attesting Officer*

C. MARSHALL DANN
*Commissioner of Patents and Trademarks*